United States Patent
Bertetti

[11] Patent Number: 6,022,275
[45] Date of Patent: Feb. 8, 2000

[54] HUB/CONSTANT VELOCITY UNIVERSAL JOINT ASSEMBLY FOR A WHEEL OF A VEHICLE, PARTICULARLY A MOTOR VEHICLE

[75] Inventor: Paolo Bertetti, Turin, Italy

[73] Assignee: SKF Industrie S.p.A., Turin, Italy

[21] Appl. No.: 08/994,755

[22] Filed: Dec. 19, 1997

[30] Foreign Application Priority Data

Dec. 20, 1996 [IT] Italy ................................ TO96A1058

[51] Int. Cl.[7] .................................................. F16C 13/00
[52] U.S. Cl. .......................... 464/178; 464/906; 384/544; 301/105.1; 403/359.6
[58] Field of Search .................................... 464/167, 178, 464/906; 403/359.1, 359.6; 384/544; 301/124.1, 126, 105.1

[56] References Cited

U.S. PATENT DOCUMENTS

| | | | |
|---|---|---|---|
| 4,047,770 | 9/1977 | Korenhof et al. | 384/544 |
| 4,576,503 | 3/1986 | Orain | 403/359.6 |
| 4,765,688 | 8/1988 | Hofmann et al. | 301/124.1 |
| 4,835,829 | 6/1989 | Welschof et al. | 384/544 |
| 4,887,917 | 12/1989 | Troster et al. | 464/178 |
| 4,915,531 | 4/1990 | Mangiavacchi | 403/359.6 |
| 5,052,979 | 10/1991 | Weischof et al. | |
| 5,209,701 | 5/1993 | Ishikawa et al. | 301/105.1 |
| 5,536,098 | 7/1996 | Schwarzler | 301/105.1 |
| 5,549,514 | 8/1996 | Welschof | 464/906 |

FOREIGN PATENT DOCUMENTS

| | | |
|---|---|---|
| 0 610 782 A1 | 8/1994 | European Pat. Off. . |
| 0 852 300 A2 | 7/1998 | European Pat. Off. . |
| 2 511 950 | 3/1983 | France . |

*Primary Examiner*—Eileen Dunn Lillis
*Attorney, Agent, or Firm*—Burns, Doane, Swecker & Mathis, L.L.P.

[57] ABSTRACT

The hub of a wheel of a motor vehicle, defined by a flanged ring of a rolling element bearing, is joined to a corresponding constant velocity universal joint by a coupling capable of transmitting torque even in the most extreme operating conditions; an intermediate ring is interposed between the hub and the joint, mounted with slight interference or with some play on a suitable smooth cylindrical centring seat of the hub and then locked axially to the hub by means of the plastic deformation of an edge at the end of the hub; the intermediate ring is provided with two opposite splined couplings defined, for example, by sets of axial teeth, one internal and the other external, disposed at one end of the ring itself, and capable of interlocking respectively with corresponding teeth for a splined coupling of the joint and the hub; alternatively, the two teeth are both formed within the intermediate ring and the teeth coupled with the hub are disposed between the races of the rolling element bearing; the intermediate ring is locked axially to the constant velocity universal joint by means of a resilient ring located in an annular hollow formed between the joint and the intermediate ring.

11 Claims, 3 Drawing Sheets

HUB/CONSTANT VELOCITY UNIVERSAL JOINT ASSEMBLY FOR A WHEEL OF A VEHICLE, PARTICULARLY A MOTOR VEHICLE

BACKGROUND OF THE INVENTION

The present invention concerns a hub/constant velocity universal joint assembly for a wheel of a vehicle, for example, a motor vehicle, and, more particularly, it concerns a system for coupling the hub with the constant velocity universal joint using an intermediate ring interposed between the hub and the constant velocity universal joint; the intermediate ring is mounted securely on the hub and is provided with angular coupling means facing both the hub and the constant velocity universal joint.

A hub/constant velocity universal joint assembly is known in the art, in which the constant velocity universal joint is coupled with the hub, and is usually constituted by a flanged ring of a second- or third-generation rolling element bearing with an interposed steel ring interference-fitted to a stub axle of the hub and coupled for rotation with the constant velocity universal by the axial teeth of a splined coupling; a resilient ring housed in a circular seat formed partly on the constant velocity universal joint and partly on the intermediate ring axially connects this latter to the constant velocity universal joint; the intermediate ring is fixed to the stub axle of the hub by means of a weld bead, or by means of a splined coupling to the stub axle and the cold plastic deformation of an edge of the axle itself.

In the first place, the hub/constant velocity universal joint assembly of the prior art is difficult to manufacture while, in the second place, the large axial dimensions of the assembly are disadvantageous.

SUMMARY OF THE INVENTION

Therefore, the principal object of the invention is to provide a hub/constant velocity universal joint assembly for a wheel of a motor vehicle, which is easy and economical to manufacture, of limited axial dimensions, and in which the coupling between the hub and the corresponding constant velocity universal joint is such as to ensure a high degree of rigidity, stability over time, and a high resistance to vibrations and torsional stresses.

In accordance with the predetermined object, therefore, the present invention provides a hub/constant velocity universal joint assembly for a wheel of a vehicle, particularly a motor vehicle, including a hub provided with flanged attachment member for receiving the wheel and being connectable in a rotary manner to a suspension of the vehicle by means of a rolling element bearing. According to one aspect of the invention, intermediate ring is fitted to one end of the hub, and a constant velocity universal joint fixedly connected for rotation with the hub by a splined coupling defined by first teeth formed on the intermediate ring.

The intermediate ring is provided with second teeth connecting the intermediate ring for rotation with the hub, and a smooth cylindrical centering surface on the hub. The end of the hub includes an edge upset by plastic deformation against the intermediate ring in order to fix the intermediate ring axially to the hub.

BRIEF DESCRIPTION OF THE DRAWINGS

Further characteristics of the invention will become clear from the following description of several preferred embodiments, given purely by way of nonlimitative example, with reference to the accompanying drawings in which.

DETAILED DESCRIPTION OF THE INVENTION

Figure 1:
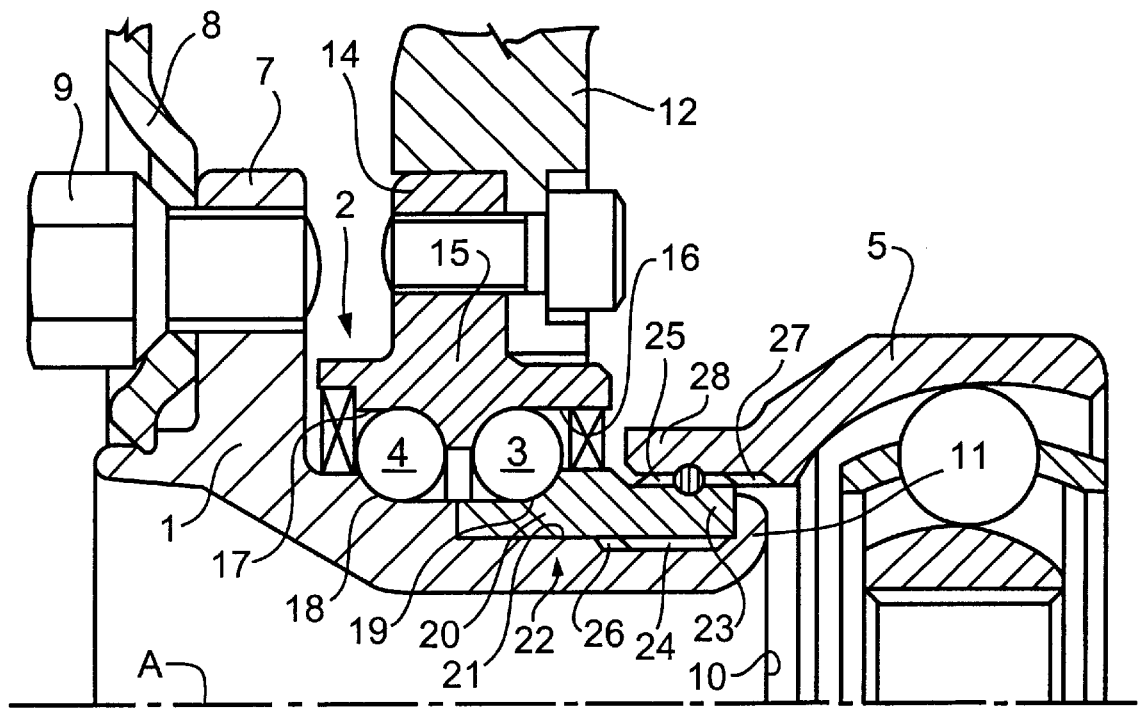
FIG. 1 is a radial section of a first embodiment of a hub/constant velocity universal joint assembly according to the present invention.

With reference to FIGS. 1–5, a hub 1 for a drive wheel of a motor vehicle is carried rotatably by a suspension of the vehicle via a bearing 2 having two rings of ball bearings 3 and 4; the hub 1 is coupled rigidly to a constant velocity universal joint 5, referred to below simply as a "joint", of a type known in the art and not described in detail.

The hub 1 is formed by a hollow cylindrical stub axle 6 which is open at its ends defining, in this particular non-limitative example, the inner ring of the bearing 2; the hub 1 has a radial flange 7 at one end for mounting a rim 8 of the wheel, which rim can be fixed to the flange 7 using bolts 9, and terminates with an annular edge 11 at an opposite end 10.

The assembly comprising the hub 1 and the joint 5 is supported by a strut 12, illustrated in partial section, of the aforesaid vehicle suspension, which strut 12 is connected by screws to a radial flange 14 forming part of an outer ring 15 fixed to the ball bearing 2; the edge 11 projects axially beyond the corresponding end of the ring 15 and is of limited thickness such that it can be deformed by cold rolling as will be seen below.

Two outer races 16 and 17 for the two rings of ball bearings 3 and 4 are formed on the inner surface of the ring 15, while two corresponding inner races 18 and 19 respectively are formed, one directly on the hub 1 and one on an intermediate ring 20 fitted to the hub 1. In a possible variant embodiment, shown in FIGS. 3 and 5, the inner races 18, 19 are formed on respective rings 120 and 131, both fitted to the hub 1.

The intermediate ring 20 is fitted to a smooth cylindrical centering seat 21 formed on the hub I by means of a smooth, cylindrical internal surface 22 adjacent the end 10 and concentric with the axis of rotation A of the bearing 2; an annular part 23 of the intermediate ring 20 extends axially towards the joint 5; two sets of axial teeth 24 and 25 are formed, on the inner and outer surfaces, respectively, of the annular part 23, which teeth are capable of forming respective splined connections for mechanically joining for rotation together the joint 5 on one side with the hub 1 on the other.

More specifically, the internal teeth 24 are capable of engaging with corresponding teeth 26 on the hub 1, while the outer teeth 25 are capable of engaging with teeth 27 formed on the interior of an axially projecting annular part 28 of the bell of the joint 5.

With the aim of minimising the forces on and the deformation of the intermediate ring 20, it has been shown experimentally that the kind of coupling between the ring 20 and the seat 21 of the hub 1 must be either a light interference coupling or a coupling with some play, in which the resulting tolerance of the coupling can be between −30 microns (interference) and +50 microns (play).

After having mounted the ring 20 in the seat 21 of the hub 1, the edge 11 of the hub 1 is folded radially and upset closely by cold plastic deformation by means of rolling against the annular part 23 of the ring 20; in this way, the ring 20 is locked rigidly and firmly to the hub 1.

The joint 5 is axially locked with respect to the intermediate ring 20 and, therefore, with respect to the hub 1 also by means of a resilient expansion ring 29 which is circular in section, located in a circumferential channel 30, partly outside the ring 20 and partly within the annular part 28 of the joint 5; as soon as the two parts of the channel 30 are put face-to-face the resilient ring 29 expands, snap-engaging the joint 5 onto the ring 20; due to the circular shape of the section of the resilient ring 29, the joint 5 can be separated from the hub 1 simply by applying sufficient axial force to the joint 5 so as to cause the resilient contraction of the ring 29 (which, as is known, has a radial split, not shown) which pushes it completely into the channel 30 formed on the ring 20.

Figure 3:
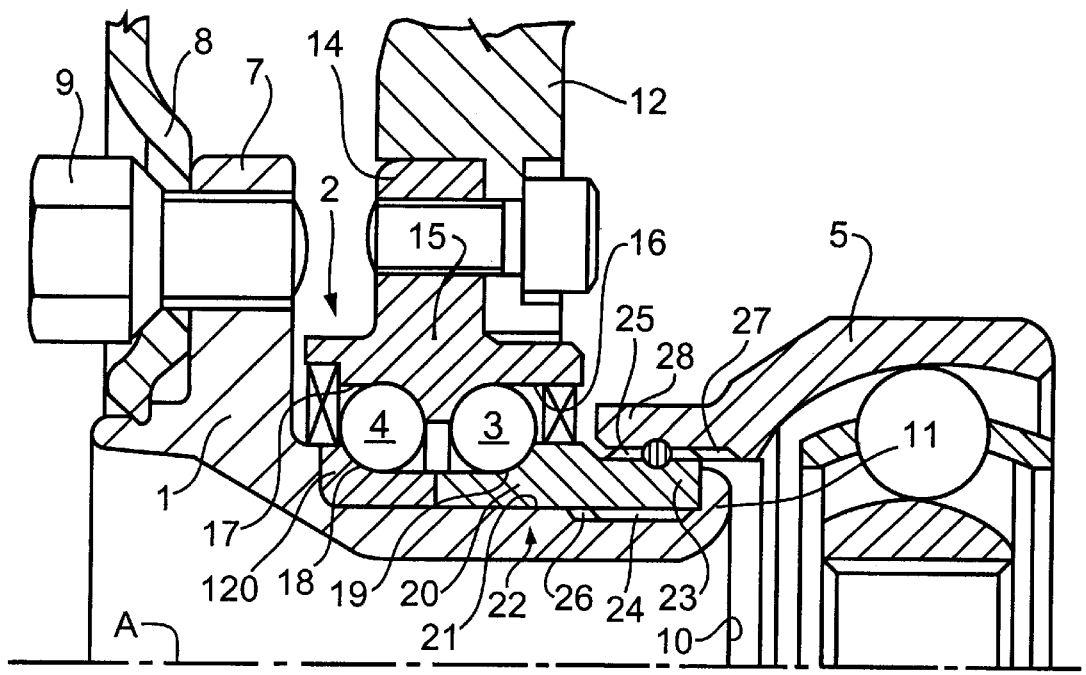
FIG. 3 is a radial section of a second embodiment of a hub/constant velocity universal joint assembly according to the present invention.
Figure 4:
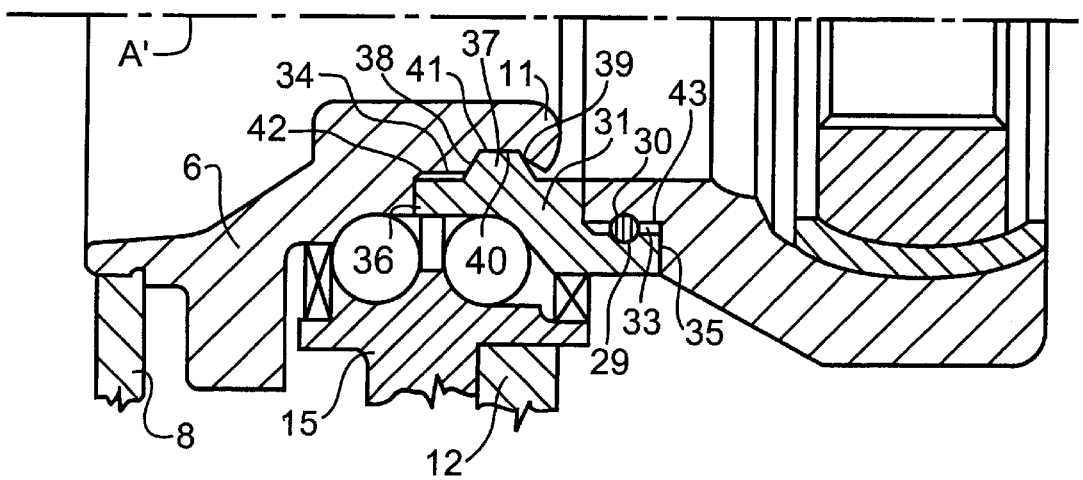
FIG. 4 is a radial section of a third embodiment of a hub/constant velocity universal joint assembly according to the present invention.
Figure 5:
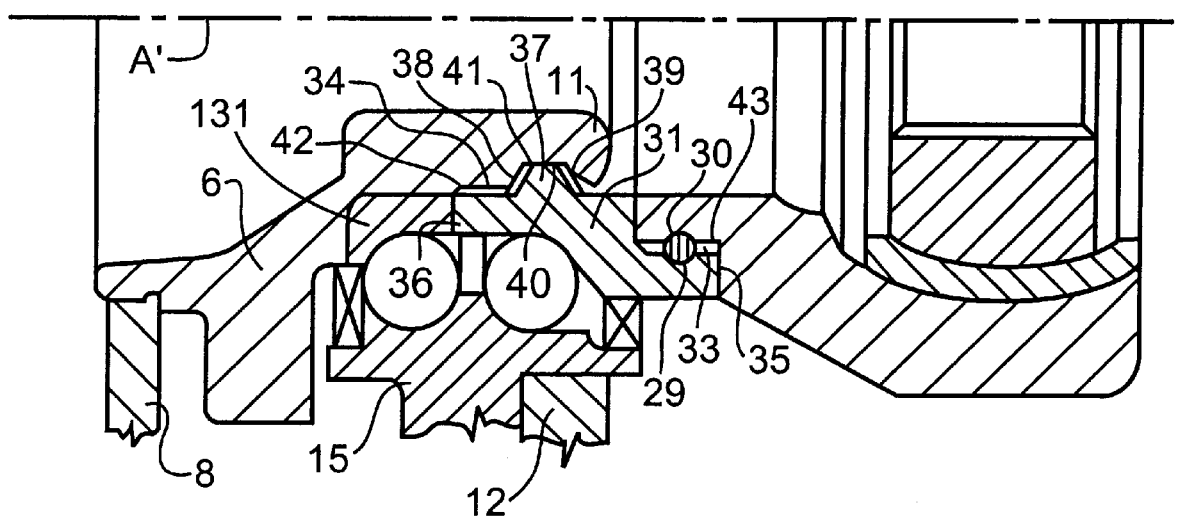
FIG. 5 is a radial section of a fourth embodiment of a hub/constant velocity universal joint assembly according to the present invention.

A different embodiment of the intermediate ring 20 is shown in FIGS. 4 and 5, in which the intermediate ring is indicated 31 (and an additional ring is indicated by 131) in order to distinguish it from that shown in the upper part of FIGS. 1 and 3.

In this embodiment, the intermediate ring 31 has two sets of axial teeth 33 and 34 both disposed radially in opposite annular ends 35, 36 of the ring 31; the ring 31 also has a collar 37 which projects inwardly in an intermediate position between the two sets of axial teeth 33, 34, and which is delimited by two conical lateral surfaces 38, 39, preferably specularly symmetrical, and by a smooth cylindrical centering surface 40 on the seat 21 of the hub 1, which is in the form of annular grooves 41; the two sets of teeth 33, 34 interlock with corresponding outer teeth, 42, 43 respectively, of the hub 1 and the joint 5.

In particular, the teeth 34, 42 for coupling the ring 31 with the hub 1 are formed so that, in use, they are disposed axially between the two faces of the ball bearing 2; similarly, the smooth centering surface 40 of the ring 31 is disposed in axial correspondence with the race 19 facing the joint 5.

The ring 31 is axially locked to the hub 1 by rolling the edge 11 which, as already described in relation to the ring 20, is upset plastically against the ring 31, in this particular example, against the conical surface 39 of the collar 37 of the ring 31. Therefore, the upset edge 11 is axially contained within the ring 31. This enables the centre of the joint to move closer to that of the bearing.

Figure 2:
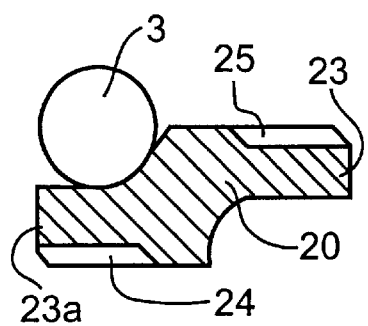
FIG. 2 shows a partial radial section of a variant intermediate ring for the constant velocity universal joint of FIG. 1.

FIG. 2 shows a different embodiment of the intermediate ring 20 in which the internal teeth 24 are disposed at an end 23a of the ring 20 opposite the annular end 23, substantially below the bearing race 19, facing the joint 5.

The sets of teeth 34, 42 can coexist with (or can be replaced by) teeth formed on the conical surface 39 (shown schematically in double line in FIG. 5) which, on rolling the edge 11, partially penetrates the upset edge 11 (which fills the spaces between the teeth), thus making the locking of the ring 31 to the hub 1 more effective.

Finally, it should be understood that the assembly described includes, or can include, many other functional parts such as sealing rings, angular velocity detectors etc, all of which are known and which, for simplicity, have not been described or illustrated as they are not part of the present invention, because the absence of their description does not prejudice the understanding of the invention.

I claim:

1. A hub/constant velocity universal joint assembly for a wheel of a vehicle, particulary a motor vehicle, comprising:
   a hub which has flanged connecting means for receiving a wheel, and is rotatably connectable to a suspension of a vehicle by means of a rolling element bearing;
   an intermediate ring fitted to one end of the hub; and a constant velocity universal joint connected for rotation with the hub by means of
   wherein the intermediate ring comprises second teeth connecting the intermediate ring to the hub for rotation therewith;
   and a smooth cylindrical centering surface on the hub; the end of the hub comprising an edge upset by plastic deformation against the intermediate ring to lock the intermediate ring axially to the hub.

2. A hub/constant velocity universal joint assembly as claimed in claim 1, wherein the first and second teeth are axial teeth formed respectively on the inside and outside of the same end of the intermediate ring facing the joint.

3. A hub/constant velocity universal joint assembly as claimed in claim 1, wherein the rolling element bearing is a bearing with two sets of rolling bodies interposed between the hub and a flanged bearing ring connectable to a suspension.

4. A hub/constant velocity universal joint assembly as claimed in claim 3, wherein the first and second teeth are axial teeth located at opposite ends of the intermediate ring.

5. A hub/constant velocity universal joint assembly as claimed in claim 4, wherein the second axial teeth are formed in such an axial position as to be located, in use, between races for the rolling bodies of the bearing.

6. A hub/constant velocity universal joint assembly as claimed in claim 4, wherein both of the first and the second axial teeth are both located between the opposite ends of the intermediate ring.

7. A hub/constant velocity universal joint assembly as claimed in claim 6, wherein the intermediate ring is provided with an internal, annular collar intermediate between the first and second teeth, and disposed substantially axially below one of the races for the rolling bodies facing the joint.

8. A hub/constant velocity universal joint assembly as claimed in claim 7, wherein the collar is delimited by two conical surfaces separated by the cylindrical centering surface of the intermediate ring on the hub.

9. A hub/constant velocity universal joint assembly as claimed in claim 8, wherein at least one of the conical surfaces is formed with adjacent corresponding conical teeth.

10. A hub/constant velocity universal joint assembly as claimed in claim 8, wherein the edge is plastically upset against the collar, against one of the conical surface, so that the edge is contained axially within the intermediate ring in order to limit the axial dimensions of the bearing.

11. A hub/constant velocity universal joint assembly as claimed in claim 1, wherein the coupling between a smooth seat and the smooth centering surface of the intermediate ring is effected with a tolerance of −30 to +50 micron.

* * * * *